United States Patent [19]
Itoh

[11] Patent Number: 5,690,721
[45] Date of Patent: Nov. 25, 1997

[54] WATER-BASE INK FOR INK JET RECORDING

[75] Inventor: Hiroshi Itoh, Nagano-ken, Japan

[73] Assignee: Seiko Epson Corporation, Tokyo-to, Japan

[21] Appl. No.: 687,585

[22] PCT Filed: Feb. 14, 1995

[86] PCT No.: PCT/JP95/00206

§ 371 Date: Oct. 11, 1996

§ 102(e) Date: Oct. 11, 1996

[87] PCT Pub. No.: WO95/21897

PCT Pub. Date: Aug. 17, 1995

[30] Foreign Application Priority Data

Feb. 14, 1994 [JP] Japan .................................. 6-017570
Jul. 22, 1994 [JP] Japan .................................. 6-171297

[51] Int. Cl.$^6$ .................................................. C09D 11/02
[52] U.S. Cl. ............................... 106/31.13; 106/31.27; 106/31.6
[58] Field of Search ..................... 106/20 R, 22 R, 106/20 C, 22 C, 31.13, 31.27, 31.6

[56] References Cited

U.S. PATENT DOCUMENTS

| | | | |
|---|---|---|---|
| 5,492,559 | 2/1996 | Oliver et al. | 106/20 D |
| 5,514,207 | 5/1996 | Fague | 106/20 E |
| 5,531,816 | 7/1996 | Wickramanayake | 106/20 R |

FOREIGN PATENT DOCUMENTS

| | | |
|---|---|---|
| 61-53374 | 3/1986 | Japan . |
| 62-169875 | 7/1987 | Japan . |
| 62-207375 | 9/1987 | Japan . |
| 1-170674 | 7/1989 | Japan . |

*Primary Examiner*—Helene Klemanski
*Attorney, Agent, or Firm*—Ladas & Parry

[57] ABSTRACT

An ink composition is disclosed which comprises a water-insoluble colorant, a water-soluble organic solvent, and water, the ink composition being substantially free from any dispersant, the water-insoluble colorant being in a dispersed state in the ink composition. The ink composition of the present invention, despite the fact that no dispersant is used, is stable and can provide a good print. A process for producing the above ink composition is also disclosed. According to this process, a stable ink composition can be produced without the step of dispersing a colorant by means of a ball mill or the like.

20 Claims, No Drawings

WATER-BASE INK FOR INK JET RECORDING

BACKGROUND OF THE INVENTION

1. Field of the Invention

The present invention relates to an ink jet recording system and more particularly to a water-base dispersion ink composition for an ink jet recording system and a process for producing the same.

2. Background Art

A water-base ink composition used in an ink jet recording system generally contains a dye or a pigment as a colorant. A water-base ink composition containing a dye, in a dissolved state, as a colorant is excellent in anti-clogging property, storage stability and other properties. Prints formed using this ink composition, however, lack in water resistance and light fastness, that is, have low fastness, often posing a problem. On the other hand, an attempt to use a pigment or a hydrophobic dye has been made in order to impart water resistance to prints. This type of ink composition, however, poses a new problem that the pigment or dye as the colorant should be stably dispersed.

Conventional water-base ink compositions using a pigment or a hydrophobic dye include, for example, an oil-base ink composition comprising an oil dye dissolved or dispersed in an organic solvent (Japanese Patent Laid-Open No. 84311/1975), a water-base ink composition comprising a dye, insoluble in water and soluble in a water-soluble organic solvent, dissolved in an aqueous mixed solution of water and a water-soluble organic solvent (Japanese Patent Laid-Open Nos. 59970/1982, 53372/1986, and 162772/1988), an emulsion ink composition comprising a hydrophobic dye dispersed in an oil-in-water emulsion form (Japanese Patent Laid-Open No. 58504/1979), a water-base ink composition with a disperse dye dispersed therein (Japanese Patent Laid-Open Nos. 59108/1975, 4665/1984, and 133076/1985), and a water-base ink composition with a water-insoluble pigment dispersed therein (Japanese Patent Laid-Open Nos. 147859/1981 and 27476/1987).

The presence of a dispersant component is indispensable for many of these ink compositions. Further, in the above ink compositions, the step of grinding or finely dispersing a colorant by a ball mill, a sand mill, or ultrasonic dispersion should be provided in order to realize a stable dispersion system.

SUMMARY OF THE INVENTION

The present inventors have now found that a water-base ink composition having a stable dispersion system can be provided substantially without use of any dispersant component.

Accordingly, an object of the present invention is to provide an ink composition, which substantially needs no dispersant component, and a process for producing the same.

Another object of the present invention is to provide an ink composition, for ink jet recording, having various properties required of ink compositions for an ink jet recording system.

The water-base ink composition of the present invention comprises a water-insoluble colorant, a water-soluble organic solvent, and water, the ink composition being substantially free from any dispersant, the water-insoluble colorant having a solubility in water at 20° C. of not more than 1% by weight and being soluble in the water-soluble organic solvent, the water-insoluble colorant being in a dispersed state in the ink composition.

The process for producing the ink composition according to the present invention comprises the step of:

dissolving a colorant in the water-soluble organic solvent; and adding water to the resultant colorant solution and mixing them together to precipitate fine particles of the colorant, thereby preparing an ink composition with the fine particles of the colorant dispersed therein.

DETAILED DESCRIPTION OF THE INVENTION

Water-insoluble Colorant

In the water-insoluble colorant used in the present invention, the "insoluble in water" means that the solubility in water at 20° C. is not more than about 1% by weight. Preferred examples of the dye or pigment include colorants which are classified, in the art, as oil dyes and disperse dyes or pigments readily soluble in an organic solvent. These colorants may be used alone or as a mixture of two or more.

In the ink composition of the present invention, the colorant is present in a dispersed state. Specifically, the colorant is present as fine particles in the ink composition of the present invention. It is not easy to define the boundary between the dissolution of a substance and the dispersion of the substance. However, in the ink composition of the present invention, the colorant can be found as particles. Color development of a print using the ink composition of the present invention depends mainly upon the colorant particles. According to a preferred embodiment of the present invention, the colorant particles have an average particle diameter of preferably about 10 nm to 10 μm, still preferably about 25 to 500 nm. Further, according to a preferred embodiment of the present invention, the colorant particles are preferably regulated, from the viewpoint of preventing clogging, so as to have such a distribution in number of particles that the amount of the particles having a diameter exceeding 20 μm is less than 1 ppm.

The ink composition of the present invention is substantially free from any dispersant. For a person having ordinary skill in the art, it would be surprising that colorant particles are dispersible in an ink composition substantially without any dispersant. The expression "substantially free from any dispersant" means that any dispersant commonly used in conventional ink compositions is not contained at all or is contained in a concentration below the critical micelle concentration (CMC). In general, the critical micelle concentration is from about 0.01 to 3.6% by weight depending upon the kind of the dispersant ("Shin-ban Kaimen Kassei Zai Hando Bukku," 119–127 (1991), Yoshida, Shindo, Ohgaki, and Yamanaka, published by Kogaku Tosho K.K.). Therefore, the dispersant should be contained in a concentration below the critical micelle concentration.

According to a preferred embodiment of the present invention, the content of the colorant in the ink composition is preferably 0.5 to 15% by weight, still preferably about 1 to 10% by weight, based on the ink composition.

As described below, the water insoluble colorant used in the present invention, when combined with a water-soluble organic solvent, should have a solubility in the water-soluble organic solvent of not less than 1% by weight.

Specific preferred examples of the water-insoluble colorant used in the present invention include:

yellow dyes, such as Oil Yellow 105 (trade name, Orient Chemical Industries, Ltd.), Oil Yellow 107 (trade name, Orient Chemical Industries, Ltd.), Oil Yellow 129 (trade name, Orient Chemical Industries, Ltd., C.I. Solvent Yellow 29), Oil Yellow 3G (trade name, Orient Chemical Industries, Ltd., C.I. Solvent Yellow 16), Oil Yellow GGS (trade name, Orient Chemical Industries, Ltd., C.I. Solvent Yellow 56), Valifast Yellow 1101 (trade name, Orient Chemical Industries, Ltd.), Valifast Yellow 1105 (trade name, Orient Chemical Industries, Ltd.), Valifast Yellow 4120 (trade name, Orient Chemical Industries, Ltd., C.I. Solvent Yellow 82), Oleosol Brilliant Yellow 5G (trade name, Taoka Chemical co., Ltd., C.I. Solvent Yellow 150), Oleosol Fast Yellow 2G (Taoka Chemical co., Ltd., C.I. Solvent Yellow 21), Oleosol Fast Yellow GCN (Taoka Chemical Co., Ltd., C.I. Solvent Yellow 151), Aizen Sot Yellow 1 (trade name, Hodogaya Chemical co., Ltd., C.I. Solvent Yellow 56), Aizen Sot Yellow 3 (trade name, Hodogaya Chemical Co., Ltd., C.I. Solvent Yellow 16), Aizen Sot Yellow 6 (trade name, Hodogaya Chemical Co., Ltd., C.I. Solvent Yellow 33), Aizen Spilon Yellow GRLH (trade name, Hodogaya Chemical Co., Ltd.), Aizen Spilon Yellow 3RH (trade name, Hodogaya Chemical Co., Ltd.), Orasol Yellow 2GLN (trade name, Ciba-Geigy, C.I. Solvent Yellow 88), Orasol Yellow 2RLN (trade name, Ciba-Geigy, C.I. Solvent Yellow 89), Orasol Yellow 3R (trade name, Ciba-Geigy, C.I. Solvent Yellow 25), Oracet Yellow GHS (trade name, Ciba-Geigy, C.I. Solvent Yellow 163), and FILAMID Yellow R (trade name, Ciba-Geigy, C.I. Solvent Yellow 21)

red dyes, such as Oil Red 5B (trade name, Orient Chemical Industries, Ltd., C.I. Solvent Red 27), Oil Red RR (trade name, Orient Chemical Industries, Ltd., C.I. Solvent Red 24), Valifast Red 1306 (trade name, Orient Chemical Industries, Ltd., C.I. Solvent Red 109), Valifast Red 1355 (trade name, Orient Chemical Industries, Ltd.), Valifast Red 2303 (trade name, Orient Chemical Industries, Ltd.), Valifast Red 3304 (trade name, Orient Chemical Industries, Ltd., C.I. Solvent Red 8), Valifast Red 3306 (trade name, Orient Chemical Industries, Ltd.), Valifast Red 3320 (trade name, Orient Chemical Industries, Ltd., C.I. Solvent Red 132), Oil Pink 312 (trade name, Orient Chemical Industries, Ltd.), Valifast Pink 2310N (trade name, Orient Chemical Industries, Ltd., C.I. Solvent Red 218), Oleosol Fast Red BL (trade name, Taoka Chemical Co., Ltd., C.I. Solvent Red 132), Oleosol Fast Red RL (trade name, Taoka Chemical Co., Ltd., C.I. Solvent Red 122), Oleosol Fast Red GL (trade name, Taoka Chemical Co., Ltd., C.I. Solvent Red 132), Oleosol Red 2G (trade name, Taoka Chemical Co., Ltd.), Oleosol Fast Pink FB (trade name, Taoka Chemical Co., Ltd., C.I. Solvent Red 218), Aizen Sot Red 1 (trade name, Hodogaya Chemical Co., Ltd., C.I. Solvent Red 24), Aizen Sot Red 2 (trade name, Hodogaya Chemical Co., Ltd., C.I. Solvent Red 27), Aizen Sot Red 3 (trade name, Hodogaya Chemical Co., Ltd., C.I. Solvent Red 18), Aizen Spilon Red BEH (trade name, Hodogaya Chemical Co., Ltd.), Aizen Spilon Red GEH (trade name, Hodogaya Chemical Co., Ltd.), Aizen Spilon Red C-GH (trade name, Hodogaya Chemical Co., Ltd.), Aizen Sot Pink 1 (trade name, Hodogaya Chemical Co., Ltd., C.I. Solvent Red 49), Orasol Red 3GL (trade name, Ciba-Geigy, C.I. Solvent Red 130), Orasol Red 2BL (trade name, Ciba-Geigy, C.I. Solvent Red 132), Orasol Red G (trade name, Ciba-Geigy, C.I. Solvent Red 125), Orasol Red B (trade name, Ciba-Geigy, C.I. Solvent Red 7), FILA-MID Red GR (trade name, Ciba-Geigy, C.I. Solvent Red 225), FILESTER Red GA (trade name, Ciba-Geigy, C.I. Solvent Red 135), FILESTER Red RBA (trade name, Ciba-Geigy, C.I. Solvent Red 230), and Orasol Pink 5BLG (trade name, Ciba-Geigy, C.I. Solvent Red 127);

blue dyes, such as Oil Blue 613 (trade name, Orient Chemical Industries, Ltd.), Oil Blue 2N (trade name, Orient Chemical Industries, Ltd., C.I. Solvent Blue 35), Oil Blue BOS (trade name, Orient Chemical Industries, Ltd.), Valifast Blue 1603 (trade name, Orient Chemical Industries, Ltd.), Valifast Blue 1605 (trade name, Orient Chemical Industries, Ltd., C.I. Solvent Blue 38), Valifast Blue 1607 (trade name, Orient Chemical Industries, Ltd.), Valifast Blue 2606 (trade name, Orient Chemical Industries, Ltd., C.I. Solvent Blue 70), Valifast Blue 2610 (trade name, Orient Chemical Industries, Ltd.), Oleosol Fast Blue ELN (trade name, Taoka Chemical Co., Ltd., C.I. Solvent Blue 70), Oleosol Fast Blue GL (trade name, Taoka Chemical Co., Ltd., C.I. Solvent Blue 70), Oleosol Blue G (trade name, Taoka Chemical Co., Ltd.), Aizen Sot Blue 1 (trade name, Hodogaya Chemical Co., Ltd., C.I. Solvent Blue 25), Aizen Sot Blue 2 (trade name, Hodogaya Chemical Co., Ltd., C.I. Solvent Blue 14), Aizen Spilon Blue GNH (trade name, Hodogaya Chemical Co., Ltd.), Aizen Spilon Blue 2BNH (trade name, Hodogaya Chemical Co., Ltd.), Aizen Spilon Blue BPNH (trade name, Hodogaya Chemical Co., Ltd.), Orasol Blue GN (trade name, Ciba-Geigy, C.I. Solvent Blue 67), Orasol Blue 2GLN (trade name, Ciba-Geigy, C.I. Solvent Blue 48), Oracet Blue 2R (trade name, Ciba-Geigy, C.I. Solvent Blue 68), Oil Blue (trade name, Chuo Synthetic Chemical), FILAMID Blue R BO (trade name, Ciba-Geigy, C.I. Solvent Blue 132), and FILESTER Blue GN (trade name, Ciba-Geigy, C.I. Solvent Blue 67); and black dyes, such as Oil Black HBB (trade name, Orient Chemical Industries, Ltd., C.I. Solvent Black 3), Oil Black 860 (trade name, Orient Chemical Industries, Ltd., C.I. Solvent Black 3), Oil Black BS (trade name, Orient Chemical Industries, Ltd., C.I. Solvent Black 7), Valifast Black 1802 (trade name, Orient Chemical Industries, Ltd.), Valifast Black 1807 (trade name, Orient Chemical Industries, Ltd.), Valifast Black 3804 (trade name, Orient Chemical Industries, Ltd., C.I. Solvent Black 34), Valifast Black 3810 (trade name, Orient Chemical Industries, Ltd., C.I. Solvent Black 29), Valifast Black 3820 (trade name, Orient Chemical Industries, Ltd., C.I. Solvent Black 27), Valifast Black 3830 (trade name, Orient Chemical Industries, Ltd.), Spirit Black SB (trade name, Orient Chemical Industries, Ltd., C.I. Solvent Black 5), Spirit Black SSBB (trade name, Orient Chemical Industries, Ltd., C.I. Solvent Black 5), Spirit Black AB (trade name, Orient Chemical Industries, Ltd., C.I. Solvent Black 5), Nigrosin base (trade name, Orient Chemical Industries, Ltd., C.I. Solvent Black 7), Oleosol Fast Black RL (trade name, Taoka Chemical Co., Ltd., C.I. Solvent Black 27), Oleosol Fast Black AR (trade name, Taoka Chemical Co., Ltd.), Aizen Sot Black 6 (trade name, Hodogaya Chemical Co., Ltd., C.I. Solvent Black 3), Aizen Sot Black 8 (trade name, Hodogaya Chemical Co., Ltd., C.I. Solvent Black 7), Aizen Spilon Black MH (trade name, Hodogaya Chemical Co., Ltd.), Aizen Spilon Black GMH (trade name, Hodogaya Chemical Co., Ltd.), Aizen Spilon Black RLH (trade name, Hodogaya Chemical Co., Ltd.), Orasol Black CN (trade name, Ciba-Geigy, C.I. Solvent Black 28), and Orasol Black RLI (trade name, Ciba-Geigy, C.I. Solvent Black 29).

It is also possible to use disperse dyes, such as Oracet Yellow 8GF (trade name, Ciba-Geigy, C.I. Disperse Yellow 82), Aizen Sot Yellow 5 (trade name, Hodogaya Chemical Co., Ltd., C.I. Disperse Yellow 3), Sumi Plast Yellow HLR (trade name, Sumitomo Chemical Co., Ltd., C.I. Disperse Yellow 54), Kayaset Yellow A-G (trade name, Nippon Kayaku Co., Ltd. C.I. Disperse Yellow 54), Sumi Plast Red B-2 (trade name, Sumitomo Chemical Co., Ltd., C.I. Disperse Red 191), Kayaset Red B (trade name, Nippon Kayaku Co., Ltd. C.I. Disperse Red 60), and FILESTER Violet BA (trade name, Ciba-Geigy, C.I. Disperse Violet 57).

Preferred examples of the pigments readily soluble in an organic solvent include Hansa Yellow G (trade name, Daido Kasei Co., Ltd., C.I. Pigment Yellow 1), Hansa Yellow GR (trade name, Daido Kasei Co., Ltd., C.I. Pigment Yellow 2), Hansa Yellow 10G (trade name, Daido Kasei Co., Ltd., C.I. Pigment Yellow 3), FILESTER Yellow RNB (trade name, Ciba-Geigy, C.I. Pigment Yellow 147), Kayaset Yellow E-AR (trade name, Nippon Kayaku Co., Ltd. C.I. Pigment Yellow 147), Kayaset Yellow E-L2R (trade name, Nippon Kayaku Co., Ltd. C.I. Pigment Yellow 142), Permanent Red 4R (trade name, Daido Kasei Co., Ltd., C.I. Pigment Red 3), Poppy Red (Dainichiseika Color & Chemicals Manufacturing. Co., Ltd., C.I. Pigment Red 17), Brilliant Fast Scarlet (trade name, Daido Kasei Co., Ltd., C.I. Pigment Red 22), 3040 Red (trade name, Dainichiseika Color & Chemicals Manufacturing. Co., Ltd., C.I. Pigment Red 23), Fast Pink Lake 6G (trade name, Noma Kagaku Kogyo K.K., C.I. Pigment Red 81), Eosine Lake (trade name, Arimoto Chemical Company Ltd., C.I. Pigment Red 90), Kayaset Red E-CG (trade name, Nippon Kayaku Co., Ltd. C.I. Pigment Red 250), Kayaset Red E-BG (trade name, Nippon Kayaku Co., Ltd. C.I. Pigment Red 249), Carmine BS (trade name, Dainippon Ink and Chemicals Ink., C.I. Pigment Red 114), and Oracet Pink RF (trade name, Ciba-Geigy, C.I. Pigment Red 181). Other preferred examples of the pigment readily soluble in an organic solvent include pigments, having fastness to solvents, such as ethanol, xylene, and oil, evaluated as a grade of 2 or less on 5-grade evaluation basis, among pigments described on pages 975 to 1109 of "Shinban, Senryo Binran" (published by Maruzen Co., Ltd., 1970).

Water-soluble Organic Solvent

The water-soluble organic solvent used in the ink composition of the present invention dissolves the above colorant. Specifically, the colorant used is soluble in the water-soluble organic solvent. The term "soluble" used herein means that the solubility of the selected colorant in the water-soluble organic solvent at room temperature is preferably not less than 1% by weight, still preferably not less than 5% by weight. However, it should be noted that even though the solubility of the colorant in the water-soluble organic solvent at room temperature is less than 1% by weight, such a water-soluble organic solvent can be used when the solubility of the colorant is not less than 1% by weight at a temperature up to the boiling point of the water-soluble organic solvent.

According to a preferred embodiment of the present invention, the water-soluble organic solvent has a lower vapor pressure than water and is compatible with water in any ratio. In this embodiment, when the solvent component of the ink composition is evaporated from the meniscus portion of the ink at the front end of the nozzle of a recording head, water is preferentially evaporated. This causes the concentration of the water-soluble organic solvent to be increased in the meniscus of the ink and its vicinity. The concentrated water-soluble organic solvent can advantageously dissolve the colorant which is in a particulate state in the ink composition, preventing the nozzle from being clogged with the precipitate of the colorant. Further, printing using the ink composition according to this embodiment can provide a better print. The reason for this is as follows. When the ink composition is dried on a recording medium after printing, water is preferentially evaporated resulting in concentration of the water-soluble organic solvent. The concentrated water-soluble organic solvent dissolves the colorant portion in the ink composition to from a colorant phase. The colorant phase can uniformly wet the recording medium, enabling the print to be firmly deposited on the recording medium.

In the present invention, the water-soluble organic solvent, either alone or as a mixture of two or more, should dissolve the colorant. However, it should be noted that, in the final ink composition, the colorant is not required to be in a dissolved state. This means that, for the final ink composition, the solubility derived from the water-soluble organic solvent may be low. Further, the ink composition having a low solubility does not advantageously attack a resin or an adhesive constituting the ink passage of an ink jet recording apparatus.

According to a preferred embodiment of the present invention, the content of the water-soluble organic solvent in the ink composition is preferably in the range of from 1 to 35% by weight, still preferably from about 5 to 25% by weight, based on the ink composition.

In the present invention, the water-soluble organic solvent of the present invention may be used alone or as a mixture of two or more.

Specific preferred examples of the water-soluble organic solvent used in the present invention include alcohols such as ethylene glycol, propylene glycol, 1, 3-butanediol, 1, 4-butanediol, 1, 5-pentanediol, 2-butene-1 , 4-diol, 2-methyl-2, 4-pentanediol, glycerin, and 1,2,6-hexanetriol; ethers such as diethylene glycol dimethyl ether and diethylene glycol diethyl ether; ketones such as acetonylacetone; esters such as y-butyrolactone, diacetin, ethylene carbonate, and triethyl phosphate; nitrogen compounds such as formamide, dimethyl formamide, diethyl formamide, dimethyl acetamide, 2-pyrrolidone, and N-methyl-2-pyrrolidone; sulfur compounds such as dimethyl sulfoxide, sulfolane, 1,3-propanesultone; multifunctional compounds such as 2-methoxyethanol, 2-ethoxyethanol, 2-(methoxymethoxy) ethanol, 2-isopropoxyethanol, 2-butoxyethanol, 2-isopenthyloxyethanol, furfuryl alcohol, tetrahydrofurfuryl alcohol, diethylene glycol, diethylene glycol monomethyl ether, diethylene glycol monoethyl ether, diethylene glycol monobutyl ether, triethylene glycol, triethylene glycol monomethyl ether, tetraethylene glycol, propylene glycol monomethyl ether, propylene glycol monoethyl ether, dipropylene glycol, dipropylene glycol monomethyl ether, dipropylene glycol monoethyl ether, tripropylene glycol monomethyl ether, diacetone alcohol, monoethanolamine, thiodiglycol, morpholine, N-ethylmorpholine, 2-methoxyethyl acetate, diethylene glycol monoethyl ether acetate, and hexamethylphosphoramide.

Water and Other Components

Water used in the ink composition of the present invention is preferably pure water or ultrapure water, such as ionexchanged water, water purified by ultrafiltration, water purified by reverse osmosis, and distilled water. Further, the use of water, which has been sterilized by ultraviolet irradiation, addition of hydrogen peroxide or the like, is also preferred because it can prevent the growth of mold and bacteria during storage for a long period of time.

If necessary, suitable additives may be further added to the ink composition of the present invention in order to improve various properties of the ink. Specific examples of the additive include penetration promoters, viscosity modifiers, surface tension modifiers, surfactants, pH adjustors, hydrotropy modifiers, humectants, antimolds, preservatives, chelating agents, and rust preventives. When the ink composition is used in an ink jet recording system utilizing electrification, a specific resistance modifier selected from inorganic salts, such as lithium chloride, sodium chloride, and ammonium chloride, may be added to the ink composition.

Preferred examples of the penetration promoter include water-soluble organic solvents, such as ethanol, isopropanol, butanol, acetone, methyl ethyl ketone, pentanol, and allyl alcohol, and nonionic surfactants. According to a preferred embodiment of the present invention, the water-soluble organic solvent added as the penetration promotor is preferably such that it does not dissolve the water-insoluble colorant at all or slightly dissolves the water-insoluble colorant. The solubility of the water-insoluble colorant in the water-soluble organic solvent as the penetration promoter is preferably less than 1% by weight. Such an water-soluble organic solvent does not dissolve particles of the colorant in the ink composition, and, at the same time, can regulate the penetration of the ink in a wide range by regulating the amount thereof added. The penetration rate of the ink composition according to the present invention is preferably not more than 20 sec with or without the addition of the penetration promoter when the amount of the printing ink is 2.5 mg/cm$^2$.

Preferred examples of the viscosity modifier include water-soluble resins, such as polyvinyl alcohol, polyvinyl pyrrolidone, casein, polyimine, carboxy methyl cellulose, and gum arabic. The viscosity of the ink according to the present invention with or without use of the viscosity modifier is preferably not more than 50 cPs at 5° C., still preferably in the range of from 1 to 10 cPs at a temperature of 5 to 35° C.

Preferred examples of the surface tension modifier include nonionic, cationic, or anionic surfactants, and alcohols, such as diethanolamine and triethanolamine. The surface tension of the ink composition according to the present invention is preferably in the range of from 25 to 70 dyn/cm with or without use of the surface tension modifier. When the surface tension is less than 25 dyn/cm, feathering or blurring of letters printed on a recording paper is likely to become significant. On the other hand, when it exceeds 70 dyn/cm, there is a tendency that, when a ruled line is printed, the segregation of ink droplets occurs along the ruled line, causing the print density to become significantly ununiform.

The surfactant can be added to the ink composition in order to lower the surface tension of the ink composition, thereby improving the penetration of the ink into a recording medium. Preferred examples of the surfactant include anionic surfactants such as fatty acid salts, sulfuric ester salts, sulfonic acid salts, and phosphoric ester salts; cationic surfactants such as amine salts, quaternary ammonium salts, and pyridinium salts; nonionic surfactants such as polyethylene oxide or polypropylene oxide derivatives and polyhydric alcohol fatty acid esters; and amphoteric surfactants such as amino acid derivatives, betaine derivatives, and amine derivatives of polyethylene oxide or polypropylene oxide. The amount of the surfactant added may be properly determined so that the penetration of the ink composition can be improved. Since, however, the ink composition of the present invention does not require the presence of any dispersant, the concentration of the surfactant in the ink composition is such that the surfactant can serve as a dispersant, that is, below the critical micelle concentration of the surfactant.

Preferred examples of the hydrotropy agent include urea, thiourea, water-soluble urea derivatives, for example, polyalkyl derivatives (e.g., tetramethylurea), acetyl derivatives, ethylene derivatives, acetylene derivatives, imino derivatives, methylol derivatives, and amino derivatives. The amount of the hydrotropy agent added is preferably in the range of from 0.01 to 20% by weight based on the ink composition.

Preferred examples of the humectant include monosaccharides and polysaccharides, such as grape sugar, maltitol, uronic acid and salts thereof, lactose, and dextrin, and water-soluble aldonic acid lactones, such as gluconic lactone and sugar acid lactone. These compounds have many hydroxyl groups in their structure and, hence, has a high affinity for water molecules, effectively preventing the evaporation of water. Further, they are advantageous in that, when a material produced upon drying of the ink is precipitated in a nozzle of a recording head, they can easily dissolve and remove the precipitate.

Ink Jet Recording

The ink composition of the present invention can be advantageously used in the so-called "ink jet recording." There is no limitation on the ink jet recording system, and the ink can be used in any of an electrostatic suction system, a pneumatic ink feed system, a piezoelectric element system, and a heat foaming system.

Further, the recording medium is also not limited to paper and, for example, may be a sheet for an overhead projector.

Further, when the ink composition of the present invention is used in an ink jet recording apparatus, it is preferably filtered between a storage section, such as an ink tank, and a recording head. The opening size of the filer is preferably about ½ of the bore diameter of the nozzle in a recording head.

Preparation of Ink Composition

The ink composition of the present invention can be prepared preferably by the following two methods.

The first methods comprises the steps of: dissolving a colorant in a water-soluble organic solvent; and mixing the resultant colorant solution with water to precipitate fine particles of the colorant.

Mixing of the colorant solution with water may be carried by any of a method wherein water is added by portions to the colorant solution and a method wherein the colorant solution is added by portions to water. Further, the colorant solution in a predetermined amount and water in a predetermined amount may be continuously added for mixing.

While there is no intention of being bound by any particular theory to account for the reason why the ink composition of the present invention substantially free from any dispersant can be prepared by this method, the reason for this is believed as follows. The colorant, which dissolved in the water-soluble organic solvent, is in a dissolved molecule state, that is, in a solution form. Mixing of the colorant solution with water in the next step results in lowered solubility of the colorant. This causes the colorant to be changed from a dissolved state to an insoluble state, resulting in the precipitation of the colorant as fine particles. In this case, the colorant precipitates as fine particles having a minimum particle diameter of about 25nm and in a monodisperse state wherein particles do not coalesce. This enables a colorant dispersion to be prepared without use of any mechanical milling means. The reason why fine particles of the colorant precipitate in a monodisperse state has not been clarified yet. It, however, is believed as follows. Since the organic solvent used is soluble in water, upon mixing of the colorant solution with water, the organic solvent present in the colorant phase is transferred to a water phase, resulting in the precipitation of the colorant as a suspension of the colorant alone rather than as an emulsion of droplets formed of the colorant and the organic solvent. For this reason, the coalescence of droplets such as found in the emulsion does not occur, so that particles do not coalesce.

According to a preferred embodiment of the present invention, the colorant solution contain 1 to 30% by weight of the colorant in a dissolved state. This is because when the colorant content is in the above content range, the diameter of precipitated particles can fall within the above preferred diameter range.

Optional additives other than the water-insoluble colorant, water-soluble organic solvent, and water may be added after the above two steps. Alternatively, in the second step, they may be mixed with water and then mixed with the colorant solution.

The second method for preparing the ink composition of the present invention comprises the steps of: dispersing a mixture of a water-insoluble colorant, a water-soluble organic solvent, and water together with a dispersant; and adding water and/or a water-soluble organic solvent and optional other additive to the dispersion and carrying out mixing. However, it should be noted that, in the second step, the amounts of the water and/or water-soluble organic solvent and optional other additive should be such that the concentration of the dispersant in the final ink composition is below the critical micelle concentration of the dispersant.

The first step in the second process may be carried out, for example, by mechanical means, such as a roll mill, a ball mill, a colloid mill, a sand mill, an attritor mill, or an agitator mill, electrolytic emulsification, or ultrasonic dispersion.

EXAMPLES

Example A1

Oleosol Black AR (trade name, Taoka Chemical Co., Ltd.)(5 g), a black oil dye, was added to and heat-dissolved in a water-soluble organic solvent mixture of 10 g of N-methyl-2-pyrrolidone with 5 g of thiodiglycol to prepare a dye solution. The whole of the dye solution was added to 80 g of distilled water over a period of one hr, thereby preparing a dye dispersion. The dye dispersion was filtered through a metallic net filter having a pore diameter of 40 μm to prepare a black ink composition.

Example A2

Oleosol Brilliant Yellow 5G (trade name, Taoka Chemical Co., Ltd., C.I. Solvent Yellow 150)(5 g), a yellow oil dye, was added to and heat-dissolved in a water-soluble organic solvent mixture of 10 g of 2-pyrrolidone with 5 g of ethylene glycol to prepare a dye solution. The dye solution was then used to prepare a yellow ink composition in the same manner as in Example 1.

Example A3

Aizen Sot Pink 1 (trade name, Hodogaya Chemical Co., Ltd., C.I. Solvent Red 49)(5 g), a red oil dye, was added to a water-soluble organic solvent mixture of 10 g of dimethyl sulfoxide with 5 g of dipropylene glycol followed by stirring to dissolve the dye in the organic solvent mixture, thereby preparing a dye solution. The dye solution was used to prepare a magenta ink composition in the same manner as in Example 1.

Example A4

Oleosol Blue G (trade name, Taoka Chemical Co., Ltd.)(5 g), a blue oil dye, was added to and heat-dissolved in a water-soluble organic solvent mixture of 10 g of γ-butyrolactone with 5 g of glycerin to prepare a dye solution. The dye solution was used to prepare a cyan ink composition in the same manner as in Example 1.

Example A5

Oleosol Black AR (trade name, Taoka Chemical Co., Ltd.)(5 g), a black oil dye, was added to 95 g of N-methyl-2-pyrrolidone followed by stirring to dissolve the dye in N-methyl-2-pyrrolidone, thereby preparing a dye solution. The whole of the dye solution was added to 890 g of distilled water over a period of 5 hr to prepare a dye dispersion. The dye dispersion was concentrated to 100 ml by ultrafiltration, and 5 g of thiodiglycol, 3 g of ethanol (penetration promoter), 3 g of diethanolamine (surface tension modifier), 5 g of urea (hydrotropy agent), and 1 g of sodium ethylenediamine tetraacetate (chelating agent) were added to the concentrate. The mixture was filtered through a metallic net filter having a pore diameter of 5 μm to prepare a black ink composition.

Example A6

Oleosol Brilliant Yellow 5G (trade name, Taoka Chemical Co., Ltd., C.I. Solvent Yellow 150)(5 g), a yellow oil dye, was added to and dissolved in 95 g of 2-pyrrolidone while stirring to prepare a dye solution. The dye solution was used to prepare a dye dispersion in the same manner as in Example 5, and 5 g of ethylene glycol, 3 g of ethanol (penetration promoter), 3 g of diethanolamine (surface tension modifier), 5 g of urea (hydrotropy agent), and 1 g of sodium ethylenediamine tetraacetate (chelating agent) were added to the concentrate. The mixture was filtered through a metallic net filter having a pore diameter of 5 μm to prepare a yellow ink composition.

Example A7

Aizen Sot Pink 1 (trade name, Hodogaya Chemical Co., Ltd., C.I. Solvent Red 49)(5 g), a red oil dye, was added to and dissolved in 95 g of dimethyl sulfoxide while stirring to prepare a dye solution. The dye solution was used to prepare a dye dispersion in the same manner as in Example 5, and 5 g of dipropylene glycol, 3 g of ethanol (penetration promoter), 3 g of diethanolamine (surface tension modifier), 5 g of urea (hydrotropy agent), and 1 g of sodium ethylenediamine tetraacetate (chelating agent) were added to the concentrate. The mixture was filtered through a metallic net filter having a pore diameter of 5 μm to prepare a magenta ink composition.

Example A8

Oleosol Blue G (trade name, Taoka Chemical Co., Ltd.)(5 g), a blue oil dye, was added to and dissolved in 95 g of γ-butyrolactone while stirring to prepare a dye solution. The dye solution was used to prepare a dye dispersion in the same manner as in Example 5, and 5 g of glycerin, 3 g of ethanol (penetration promoter), 3 g of diethanolamine (surface tension modifier), 5 g of urea (hydrotropy agent), and 1 g of sodium ethylenediamine tetraacetate (chelating agent) were added to the concentrate. The mixture was filtered through a metallic net filter having a pore diameter of 5 μm to prepare a cyan ink composition.

Example A9

Oleosol Black AR (trade name, Taoka Chemical Co., Ltd.)(20 g), a black oil dye, 10 g of N-methyl-2-pyrrolidone, 3 g of polyethylene glycol nonylphenyl ether, and 80 g of distilled water were mixed together, and the mixture was dispersed by means of an agitator mill for 20 min to prepare a high-concentration dispersion of a black oil dye. To the dispersion were added 30 g of N-methyl-2-pyrrolidone, 20 g of thiodiglycol, 12 g of ethanol (penetration promoter), 12g of diethanolamine (surface tension modifier), 20 g of urea (hydrotropy agent), 4 g of sodium ethylenediamine tetraacetate (chelating agent), and 240 g of distilled water. The mixture was filtered through a metallic net filter having a pore diameter of 40 μm to prepare a black ink composition.

The concentration of polyethylene glycol nonylphenyl ether in the ink composition was 0.7% by weight, i.e., lower than the critical micelle concentration (0.9% by weight (degree of polymerization of polyethylene glycol: 100), ("Shin-ban Kaimen Kassei Zai Hando Bukku," 126 (1991), Yoshida, Shindo, Ohgaki, and Yamanaka, published by Kogaku Tosho K.K.).

Example A10

Oleosol Brilliant Yellow 5G (trade name, Taoka Chemical Co., Ltd., C.I. Solvent Yellow 150)(20 g), a yellow oil dye, 10 g of 2-pyrrolidone, 3 g of polyethylene glycol nonylphenyl ether (surfactant), and 80 g of distilled water were mixed together, and the mixture was dispersed by means of an agitator mill for 20 min to prepare a high-concentration dispersion of a yellow oil dye. To the dispersion were added 30 g of 2-pyrrolidone, 20 g of ethylene glycol, 12 g of ethanol (penetration promoter), 12 g of diethanolamine (surface tension modifier), 20 g of urea (hydrotropy agent), 4 g of sodium ethylenediamine tetraacetate (chelating agent), and 240 g of distilled water. The mixture was filtered through a metallic net filter having a pore diameter of 40 μm to prepare a yellow ink composition.

The concentration of polyethylene glycol nonylphenyl ether in the ink composition was 0.7% by weight, i.e., lower than the critical micelle concentration.

Example A11

Aizen Sot Pink 1 (trade name, Hodogaya Chemical Co., Ltd., C.I. Solvent Red 49)(20 g), a red oil dye, 20 g of dimethyl sulfoxide, 3 g of polyethylene glycol nonylphenyl ether, and 80 g of distilled water were mixed together, and the mixture was dispersed by means of an agitator mill for 20 min to prepare a high-concentration dispersion of a red oil dye. To the dispersion were added 30 g of dimethyl 'sulfoxide, 20 g of dipropylene glycol, 12 g of ethanol (penetration promoter), 12 g of diethanolamine (surface tension modifier), 20 g of urea (hydrotropy agent), 4 g of sodium ethylenediamine tetraacetate (chelating agent), and 240 g of distilled water. The mixture was filtered through a metallic net filter having a pore diameter of 40 μm to prepare a magenta ink composition.

The concentration of polyethylene glycol nonylphenyl ether in the ink composition was 0.7% by weight, i.e., lower than the critical micelle concentration.

Example A12

Oleosol Blue G (trade name, Taoka Chemical Co., Ltd.) (20 g), a blue oil dye, 10 g of γ-butyrolactone, 3 g of polyethylene glycol nonylphenyl ether, and 80 g of distilled water were mixed together, and the mixture was dispersed by means of an agitator mill for 20 min to prepare a high-concentration dispersion of a blue oil dye. To the dispersion were added 30 g of γ-butyrolactone, 20 g of glycerin, 12 g of ethanol (penetration promoter), 12 g of diethanolamine (surface tension modifier), 20 g of urea (hydrotropy agent), 4 g of sodium ethylenediamine tetraacetate (chelating agent), and 240 g of distilled water. The mixture was filtered through a metallic net filter having a pore diameter of 40 μm to prepare a cyan ink composition.

The concentration of polyethylene glycol nonylphenyl ether in the ink composition was 0.7% by weight, i.e., lower than the critical micelle concentration.

Example A13

Oleosol Black AR (trade name, Taoka Chemical Co., Ltd.)(5 g), a black oil dye, was added to and heat-dissolved in a water-soluble organic solvent mixture of 10 g of N-methyl-2-pyrrolidone with 3 g of thiodiglycol to prepare a dye solution. The whole of the dye solution was added to 780 g of distilled water over a period of one hr, and 20 g of gluconic lactone (humectant) was added thereto to prepare a dye dispersion. The dye dispersion was filtered through a metallic net filter having a pore diameter of 40 μm to prepare a ink composition.

Example A14

Oleosol Black AR (trade name, Taoka Chemical Co., Ltd.)(5 g), a black oil dye, was added to 95 g of N-methyl-2-pyrrolidone followed by stirring to dissolve the dye in N-methyl-2-pyrrolidone, thereby preparing a dye solution. The whole of the dye solution was added to 870 g of distilled water over a period of 5 hr to prepare a dye dispersion. The dye dispersion was concentrated to 100 ml by ultrafiltration, and 5 g of thiodiglycol, 3 g of ethanol (penetration promoter), 3 g of diethanolamine (surface tension modifier), 5 g of urea (hydrotropy agent), 20 g of gluconic lactone (humectant), and 1 g of sodium ethylenediamine tetraacetate (chelating agent) were added to the concentrate. The mixture was filtered through a metallic net filter having a pore diameter of 40 μm to prepare a ink composition.

Comparative Example A1

Oil Black 860 (trade name, Orient Chemical Industries, Ltd., C.I. Solvent Black 23)(5 g), a black oil dye, was dissolved in 20 g of benzyl alcohol to prepare a dye solution. The dye solution was added to 75 g of a solution of 5 g of polyethylene glycol nonylphenyl ether dissolved in water followed by emulsification and dispersion with a colloid mill to prepare an ink composition as an oil-in-water dispersion type emulsion.

Benzyl alcohol used herein is an organic solvent which has a solubility in water of about 3.7% by weight and a low miscibility with water.

Comparative Example A2

Kayaset Yellow A-G (trade name, Nippon Kayaku Co., Ltd., C.I. Disperse Yellow 54)(2 g) and 3 g of FILESTER violet BA (trade name, Ciba-Geigy, Disperse violet 57) were added to a mixed solution of 10 g of N-methyl-2-pyrrolidone, 5 g of thiodiglycol, 5 g of sodium diisobutyl-naphthalate (a surfactant), and 75 g of distilled water, and the mixture was dispersed by means of an agitator mill for 1 hr. The dispersion was filtered through a metallic net filter having a pore diameter of 40 μm to prepare a black ink composition.

The concentration of sodium diisobutylnaphthalate in the ink composition was 5% by weight, i.e., higher than the critical micelle concentration (0.3% by weight, "Shin-ban Kaimen Kassei Zai Hando Bukku," supra).

Evaluation Test for Ink Compositions

Printing was carried out using ink compositions prepared in Example A1 to A14 and Comparative Examples A1 and A2 by means of an ink jet recording apparatus, and the prints were evaluated.

MJ-500 (trade name, Seiko Epson Corporation) was used as the ink jet recording apparatus.

Water Resistance

Prints formed by solid printing were immersed in water for 10 min and then dried for 24 hr. The optical density of the prints were measured before and after this test. The change in optical density between before and after the test was evaluated according to the following criteria.

Reduction in optical density:

Less than 20% ... Good (○)

Not less than 20% ... Poor (X)

Transfer Resistance

Prints formed by solid printing and plain recording paper were put on top of each other and, in this state, allowed to stand at 60° C. for 24 hr. The optical density of the prints were measured before and after this test. The change in optical density between before and after the test was evaluated according to the following criteria.

Reduction in optical density:

Less than 20% ... Good (○)

Not less than 20% ... Poor (X)

Continuous Printing Stability

Solid printing was continuously carried out on 150 sheets of paper. Then, the optical density was measured for the first print and the 150th print. The difference in optical density between the two prints was evaluated as follows.

Difference in optical density:

Within ±15% ... Good (○)

Exceeding ±15% ... Poor (X)

Printing After Drying

Solid printing was carried out. The front end of the ink jet recording apparatus was covered with a rubber cap. In this state, the ink jet recording apparatus was allowed to stand at 40° C. for two weeks. After standing, solid printing was resumed. The optical density was measured for the solid print before standing and the solid print after standing, and the difference in optical density was evaluated as followed.

Difference in optical density:

Within ±15% ... Good (○)

Exceeding ±15% ... Poor (X)

Corrosiveness

Polystyrene, polyurethane, polysulfone, and a cured epoxy resin adhesive were immersed in ink compositions at 70° C. for 6 days. The weight of these materials was measured before and after immersion, and the change in weight was evaluated as follows.

Change in weight:

Within ±1% ... Good (○)

Exceeding ±1% ... Poor (X)

The results of evaluation were as given in Table 1.

TABLE 1

| Ink | Fastness of print | | Printing stability | | |
|---|---|---|---|---|---|
| | Water resistance | Transfer resistance | Continuous printing | Printing after drying | Corrosiveness |
| Ex. A1 | ○ | ○ | ○ | ○ | ○ |
| A2 | ○ | ○ | ○ | ○ | ○ |
| A3 | ○ | ○ | ○ | ○ | ○ |
| A4 | ○ | ○ | ○ | ○ | ○ |
| A5 | ○ | ○ | ○ | ○ | ○ |
| A6 | ○ | ○ | ○ | ○ | ○ |
| A7 | ○ | ○ | ○ | ○ | ○ |
| A8 | ○ | ○ | ○ | ○ | ○ |
| A9 | ○ | ○ | ○ | ○ | ○ |
| A10 | ○ | ○ | ○ | ○ | ○ |
| A11 | ○ | ○ | ○ | ○ | ○ |
| A12 | ○ | ○ | ○ | ○ | ○ |
| A13 | ○ | ○ | ○ | ○ | ○ |
| A14 | ○ | ○ | ○ | ○ | ○ |
| Comp. A1 | X | ○ | ○ | X | ○* |
| Ex. A2 | X | X | ○ | ○ | ○ |

*Swelling of the resin was observed, although there was no change in weight.

Example B1

Oleosol Brilliant Yellow 5G (trade name, Taoka Chemical Co., Ltd., C.I. Solvent Yellow 150)(30 g), a yellow colorant, was mixed and stirred in a water-soluble organic solvent mixture of 10 g of diethylene glycol with 60g of N-methyl-2-pyrrolidone while heating to prepare a colorant solution. The whole of the colorant solution was added to 400 g of distilled water being stirred with a stirrer over a period of one hr, thereby preparing an water-base ink composition.

The average diameter of colorant particles dispersed in the ink composition as measured by the light scattering method was 307 nm.

Example B2

Aizen Sot Pink 1 (trade name, Hodogaya Chemical Co., Ltd., C.I. Solvent Red 49)(20 g), a red colorant, was mixed and stirred in a water-soluble organic solvent mixture of 20 g of ethanol with 60 g of 2-pyrrolidone while heating to prepare a colorant solution. The whole of the colorant solution was added to 400 g of distilled water being stirred with a stirrer while heating over a period of 30 min, thereby preparing an ink composition.

The average diameter of colorant particles dispersed in the ink composition as measured by the light scattering method was 340 nm.

Example B3

Aizen Sot Blue 1 (trade name, Hodogaya Chemical Co., Ltd., C.I. Solvent Blue 25)(10 g), a blue colorant, was mixed and stirred in a water-soluble organic solvent mixture of 60 g of γ-butyrolactone with 20 g of glycerin while heating to prepare a colorant solution. The whole of the colorant solution was added to 400 g of distilled water being stirred with a stirrer over a period of 2 hr, thereby preparing an ink composition.

The average diameter of colorant particles dispersed in the ink composition as measured by the light scattering method was 235 nm.

Example B4

Oleosol Black AR (trade name, Taoka Chemical Co., Ltd.)(30 g), a black colorant, was mixed and stirred in 70 g of N-methyl-2-pyrrolidone while heating to prepare a colorant solution. The whole of the colorant solution was added to 400 g of a 5% aqueous urea solution being stirred with a stirrer over a period of 2 hr, thereby preparing an ink composition.

The average diameter of colorant particles dispersed in the ink composition as measured by the light scattering method was 554 nm.

Example B5

A colorant solution was prepared in the same manner as in Example B4. The whole of the colorant solution was added to 300 g of a 5% aqueous urea solution being stirred with a stirrer over a period of 2 hr, thereby preparing an ink composition.

The average diameter of colorant particles dispersed in the ink composition as measured by the light scattering method was 512 nm.

Example B6

Oleosol Black AR (trade name, Taoka Chemical Co., Ltd.)(30 g), a black colorant, was mixed and stirred in a water-soluble organic solvent mixture of 50 g of N-methyl-2-pyrrolidone with 20 g of glycerin while heating to prepare a colorant solution. The whole of the colorant solution was added to 200 g of a 5% aqueous urea solution being stirred with a stirrer over a period of 2 hr, thereby preparing an ink composition.

The average diameter of colorant particles dispersed in the ink composition as measured by the light scattering method was 500 nm.

Example B7

Oleosol Black AR (trade name, Taoka Chemical Co., Ltd.)(30 g), a black colorant, was mixed and stirred in a water-soluble organic solvent mixture of 40 g of N-methyl-2-pyrrolidone with 30 g of glycerin while heating to prepare a colorant solution. The whole of the colorant solution was added to 100 g of a 5% aqueous urea solution being stirred with a stirrer over a period of 2 hr, thereby preparing an ink composition.

The average diameter of colorant particles dispersed in the ink composition as measured by the light scattering method was 547 nm.

Example B8

Oleosol Black AR (trade name, Taoka Chemical Co., Ltd.)(15 g), a black colorant, was mixed and stirred in a water-soluble organic solvent mixture of 60 g of N-methyl-2-pyrrolidone with 25 g of glycerin while heating to prepare a colorant solution. The whole of the colorant solution was added to 500 g of a 2% aqueous urea solution being stirred with a stirrer over a period of one hr, thereby preparing an ink composition.

The average diameter of colorant particles dispersed in the ink composition as measured by the light scattering method was 217 nm.

Example B9

A colorant solution was prepared in the same manner as in Example 8. The whole of the colorant solution was added to 300 g of a 2% aqueous urea solution being stirred with a stirrer over a period of one hr, thereby preparing an ink composition.

The average diameter of colorant particles dispersed in the ink composition as measured by the light scattering method was 220 nm.

Example B10

Oleosol Black AR (trade name, Taoka Chemical Co., Ltd.)(15 g), a black colorant, was mixed and stirred in a water-soluble organic solvent mixture of 45 g of N-methyl-2-pyrrolidone with 40 g of glycerin while heating to prepare a colorant solution. The whole of the colorant solution was added to 100 g of a 2% aqueous urea solution being stirred with a stirrer over a period of one hr, thereby preparing an ink composition.

The average diameter of colorant particles dispersed in the ink composition as measured by the light scattering method was 208 nm.

Example B11

Oleosol Black AR (trade name, Taoka Chemical Co., Ltd.)(5 g), a black colorant, was mixed and stirred in a water-soluble organic solvent mixture of 50 g of N-methyl-2-pyrrolidone with 45 g of glycerin while heating to prepare a colorant solution. The whole of the colorant solution was added to 300 g of distilled water being stirred with a stirrer over a period of 30 min, and 3 g of tetramethylurea was further added to and dissolved in the mixture, thereby preparing an ink composition.

The average diameter of colorant particles dispersed in the ink composition as measured by the light scattering method was 75 nm.

Example B12

A colorant solution was prepared in the same manner as in Example B11. The whole of the colorant solution was added to 100 g of distilled water being stirred with a stirrer over a period of 30 min, and 3 g of tetramethylurea was further added to and dissolved in the mixture, thereby preparing an ink composition.

The average diameter of colorant particles dispersed in the ink composition as measured by the light scattering method was 68 nm.

Example B13

Aizen Sot Black 6 (trade name, Hodogaya Chemical Co., Ltd.)(1 g), a black colorant, was mixed and stirred in a water-soluble organic solvent mixture of 30 g of N-methyl-2-pyrrolidone with 69 g of glycerin while heating to prepare a colorant solution. The whole of the colorant solution was added to 100 g of distilled water being stirred with a stirrer over a period of 30 min, thereby preparing an ink composition.

The average diameter of colorant particles dispersed in the ink composition as measured by the light scattering method was 34 nm.

Example B14

Kayaset Yellow E-AR (trade name, Nippon Kayaku Co., Ltd., Pigment Yellow 147)(10 g), a yellow colorant, was mixed and stirred in 90 g of N-methyl-2-pyrrolidone while heating to prepare a colorant solution. The colorant solution and a 5% aqueous tetramethylurea solution were simultaneously fed at respective rates of 10 g/min and 40 g/min and mixed together while heating at 50° C. to prepare an ink composition.

The average diameter of colorant particles dispersed in the ink composition as measured by the light scattering method was 205 nm.

Example B15

Oracet Pink RF (trade name, Ciba-Geigy, Pigment Red 181)(10 g), a red colorant, was mixed and stirred in 90 g of N-methyl-2-pyrrolidone while heating to prepare a colorant solution. The colorant solution and an aqueous solution containing 5% urea and 1% polypropylene glycol were simultaneously fed at respective rates of 10 g/min and 40 g/min and mixed together while heating at 50° C. to prepare an ink composition.

The concentration of polypropylene glycol in the ink composition was 1% by weight. Since the critical micell concentration of polypropylene glycol cannot be clearly defined, the critical micell concentration was examined based on the ability of polypropylene glycol to solubilize the hydrophobic colorant. The ink composition was first centrifuged at 400,000×g for 2 hr. The resultant supernatant was colorless. Thus, it was confirmed that the colorant was not solubilized with polypropylene glycol and, hence, the polypropylene glycol concentration of the ink was below the critical micell concentration.

Example B16

Aizen Sot Yellow 5 (trade name, Hodogaya Chemical Co., Ltd. Disperse Yellow 3)(15 g), a yellow colorant, was mixed and stirred in 85 g of 2-pyrrolidone while heating to prepare a colorant solution. The whole of the colorant solution was added to 400 g of a 2% aqueous polypropylene glycol solution being stirred with a stirrer over a period of one hr, thereby preparing an ink composition.

The concentration of polypropylene glycol in the ink composition was 1.6% by weight. The critical micell concentration was examined in the same manner as in Example 15. The resultant supernatant was colorless. Thus, it was confirmed that the polypropylene glycol concentration of the ink was below the critical micell concentration.

The average diameter of colorant particles dispersed in the ink composition as measured by the light scattering method was 214 nm.

Example B17

Kayaset Red B (trade name, Nippon Kayaku Co., Ltd., Disperse Red 60)(15 g), a red colorant, was mixed and stirred in 85 g of dimethyl sulfoxide while heating to prepare a colorant solution. The whole of the colorant solution was added to 400 g of a 2% aqueous polypropylene glycol solution being stirred with a stirrer over a period of 30 min, thereby preparing an ink composition.

The concentration of polypropylene glycol in the ink composition was 1.6% by weight. The critical micell concentration was examined in the same manner as in Example B15. The resultant supernatant was colorless. Thus, it was confirmed that the polypropylene glycol concentration of the present ink was below the critical micell concentration.

The average diameter of colorant particles dispersed in the ink composition as measured by the light scattering method was 246 nm.

Example B18

FILESTER Violet BA (trade name, Ciba-Geigy, Disperse Violet 57)(15 g), a blue colorant, was mixed and stirred in 85 g of 2-pyrrolidone while heating to prepare a colorant solution. The whole of the colorant solution was added to 400 g of a 2% aqueous polypropylene glycol solution being stirred with a stirrer over a period of 2 hr, thereby preparing an ink composition.

The concentration of polypropylene glycol in the ink composition was 1.6% by weight. The critical micell concentration was examined in the same manner as in Example B15. The resultant supernatant was colorless. Thus, it was confirmed that the polypropylene glycol concentration of the present ink was below the critical micell concentration.

The average diameter of colorant particles dispersed in the ink composition as measured by the light scattering method was 270 nm. Thus, it was found that the colorant was not in a dissolved state in the ink composition.

Comparative Example B1

N-methyl-2-pyrrolidone (90 g), 20 g of urea, 375 g of distilled water, and 15 g of polyethylene glycol nonylphenyl ether were mixed and dissolved in one another. Kayaset Yellow E-AR (trade name, Nippon Kayaku Co., Ltd., Pigment Yellow 147)(10 g), a yellow colorant, was mixed with the solution, and the mixture was dispersed by means of a ball mill for 4 hr to prepare an ink composition.

The concentration of polyethylene glycol nonylphenyl ether in the ink composition was 2.9% by weight, i.e., higher than the critical micell concentration.

The average diameter of colorant particles dispersed in the ink composition as measured by the light scattering method was 273 nm.

Further, the ink composition was centrifuged at 400,000×g for 2 hr. The resultant supernatant was yellow colored. Thus, it was confirmed that the colorant was in a dissolved state in the ink composition.

Comparative Example B2

Dimethylformamide (85 g), 20 g of sodium diisobutylnaphthalate, and 395 g of distilled water were mixed and dissolved in one another to prepare an aqueous dispersant solution. Kayaset Red B (trade name, Nippon Kayaku Co., Ltd., Disperse Red 60)(15 g), a red colorant, was added to and mixed with the aqueous dispersant solution, and the mixture was dispersed while cooling for 5 hr by means of an ultrasonic dispergator, thereby preparing an ink composition.

The concentration of sodium diisobutylnaphthalate in the ink composition was 3.9% by weight, i.e., higher than the critical micelle concentration.

The average diameter of colorant particles dispersed in the ink composition as measured by the light scattering method was 360 nm.

Further, the ink composition was centrifuged at 400,000×g for 2 hr. The resultant supernatant was red colored. Thus, it was confirmed that the colorant was in a dissolved state in the ink composition.

Evaluation Test for Ink Composition

Printing was carried out using ink compositions prepared in Example B1 to B18 and Comparative Examples B1 and B2 with an ink jet recording apparatus. Thus, the prints were evaluated in the same manner as in Example A.

The results were as given in Table 2.

Dispersion Stability

The ink compositions prepared in Example B and Comparative Example B were evaluated for the dispersion stability.

The ink compositions were allowed to stand at 60° C. for one month for the ink compositions of Examples B1 to B13, at room temperature for 3 months for the ink compositions of Examples B14 and B15, and at 40° C. for 2 months for the ink compositions of Examples B16 to B18. The state of dispersion was observed before and after standing to examine whether or not there was a change in the state of dispersion, such as occurrence of a precipitate, between before and after standing. Further, printing was carried out using the ink compositions-before and after standing, and the prints were evaluated in the same manner as described above to examine whether or not the results of evaluation of the print after standing changed from those of the print before standing. The results were as given in Table 2.

TABLE 2

| Ink | | Fastness of print | | Printing stability | | Corrosiveness | Dispersion stability |
|---|---|---|---|---|---|---|---|
| | | Water resistance | Transfer resistance | Continuous printing | Printing after drying | | |
| Ex. | B1 | O | O | O | O | O | Not changed |
| | B2 | O | O | O | O | O | Not changed |
| | B3 | O | O | O | O | O | Not changed |
| | B4 | O | O | O | O | O | Not changed |
| | B5 | O | O | O | O | O | Not changed |
| | B6 | O | O | O | O | O | Not changed |
| | B7 | O | O | O | O | O | Not changed |
| | B8 | O | O | O | O | O | Not changed |
| | B9 | O | O | O | O | O | Not changed |
| | B10 | O | O | O | O | O | Not changed |
| | B11 | O | O | O | O | O | Not changed |
| | B12 | O | O | O | O | O | Not changed |
| | B13 | O | O | O | O | O | Not changed |
| | B14 | O | O | O | O | O | Not changed |
| | B15 | O | O | O | O | O | Not changed |
| | B16 | O | O | O | O | O | Not changed |
| | B17 | O | O | O | O | O | Not changed |
| | B18 | O | O | O | O | O | Not changed |
| Comp.Ex. | B1 | X | O | O | X | O | Not changed |
| | B2 | X | O | O | O | O | Not changed |

I claim:

1. A water-base ink composition comprising a water-insoluble colorant, a water-soluble organic solvent, and water,
   the ink composition being substantially free from any dispersant,
   the water-insoluble colorant having a solubility in water at 20° C. of not more than 1% by weight and being soluble in the water-soluble organic solvent,
   the water-insoluble colorant being in a dispersed state in the ink composition.

2. The ink composition according to claim 1, wherein the water-insoluble colorant is selected from an oil dye, a disperse dye, and a pigment soluble in an organic solvent.

3. The ink composition according to claim 1, wherein the water-soluble organic solvent has a lower vapor pressure than water and is compatible with water in any ratio.

4. The ink composition according to claim 1, which further comprises a water-soluble organic solvent which does not dissolve or sparingly dissolves the water-insoluble colorant.

5. The ink composition according to claim 1, wherein the content of the colorant is 0.5 to 15% by weight based on the ink composition.

6. The ink composition according to claim 1, which further comprises 0.01 to 20% by weight, based on the ink composition, of a hydrotropy agent.

7. The ink composition according to claim 6, wherein the hydrotropy agent is a water-soluble urea derivative.

8. The ink composition according to claim 1, which further comprises a humectant.

9. The ink composition according to claim 8, wherein the humectant is a saccharide or an aldonic acid lactone.

10. An ink composition jet recording method comprising the step of ejecting droplets of an ink composition according to claim 1 onto a recording medium to form an image constituted by the droplets.

11. A process for producing a water-base ink composition according to claim 1, comprising the steps of:
   dissolving a colorant in the water-soluble organic solvent; and
   adding water to the resultant colorant solution and mixing them together to precipitate fine particles of the colorant, thereby preparing an ink composition with the fine particles of the colorant dispersed therein.

12. The process according to claim 11, wherein the content of the colorant in a dissolved state in the colorant solution is 1 to 30% by weight.

13. A process for producing a water-base ink composition comprising the steps of:
   dissolving a water insoluble colorant in a water-soluble organic solvent to form a colorant solution with the colorant being present in a dissolved state in the colorant solution in an amount of 1 to 30% by weight; and
   adding water to the colorant solution and mixing to precipitate fine particles of the colorant such that the fine particles of the colorant are present in the ink composition as a dispersion and not as an emulsion of droplets formed of the colorant and the organic solvent, the colorant and water-soluble organic solvent being included in the colorant solution and the water and optional other components being added to the colorant solution in respective amounts such that the colorant is present in the ink composition in an amount of 0.5 to 15% by weight and the water-soluble organic solvent is present in the ink composition in an amount of 1 to 35% by weight.

14. An ink composition formed by the process of claim 13.

15. An ink jet recording method comprising the step of ejecting droplets of the ink composition of claim 2 onto a recording medium to form an ink image.

16. An ink jet recording method comprising the step of ejecting droplets of the ink composition of claim 3 onto a recording medium to form an ink image.

17. An ink jet recording method comprising the step of ejecting droplets of the ink composition of claim 4 onto a recording medium to form an ink image.

18. An ink jet recording method comprising the step of ejecting droplets of the ink composition of claim 5 onto a recording medium to form an ink image.

19. An ink jet recording method comprising the step of ejecting droplets of the ink composition of claim 6 onto a recording medium to form an ink image.

20. An ink jet recording method comprising the step of ejecting droplets of the ink composition of claim 7 onto a recording medium to form an ink image.

* * * * *